(12) United States Patent
Roberge

(10) Patent No.: US 8,776,678 B2
(45) Date of Patent: Jul. 15, 2014

(54) BALE WRAPPING SYSTEM AND METHOD FOR A PLANT MATERIAL COMPACTOR

(75) Inventor: Martin J. Roberge, Saskatoon (CA)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/817,996

(22) PCT Filed: Aug. 24, 2011

(86) PCT No.: PCT/US2011/048983
§ 371 (c)(1),
(2), (4) Date: Feb. 20, 2013

(87) PCT Pub. No.: WO2012/027484
PCT Pub. Date: Mar. 1, 2012

(65) Prior Publication Data
US 2013/0160660 A1    Jun. 27, 2013

Related U.S. Application Data

(60) Provisional application No. 61/402,124, filed on Aug. 24, 2010.

(51) Int. Cl.
*A01F 15/08* (2006.01)
*B30B 9/30* (2006.01)
(52) U.S. Cl.
USPC ............ 100/2; 100/11; 53/397; 53/389.3; 53/436; 53/545; 53/586
(58) Field of Classification Search
USPC ........ 100/2, 3, 4, 5, 76, 11; 53/118, 228, 397, 53/399, 389.2, 389.3, 436, 438, 439, 446, 53/545, 548, 553, 586; 56/341
See application file for complete search history.

(56) References Cited

U.S. PATENT DOCUMENTS

| | | | |
|---|---|---|---|
| 2,741,885 A | 4/1956 | Allison | |
| 4,044,529 A | 8/1977 | Zelnick | |
| 4,074,623 A | 2/1978 | White | |
| 4,553,378 A | 11/1985 | Fachini et al. | |
| 4,617,784 A * | 10/1986 | Golicz et al. | 53/540 |
| 5,367,857 A | 11/1994 | Carlson | |
| 5,553,446 A * | 9/1996 | Sibley et al. | 56/341 |

(Continued)

FOREIGN PATENT DOCUMENTS

| | | |
|---|---|---|
| EP | 0048383 | 3/1982 |
| EP | 0789991 | 5/2002 |

(Continued)

*Primary Examiner* — Jimmy T Nguyen
(74) *Attorney, Agent, or Firm* — Rebecca L. Henkel

(57) ABSTRACT

A wrapping system for plant material utilizes a first wrapping material dispenser disposed along a first upper periphery of a compacting chamber, and a second wrapping material dispenser opposite the first dispenser, for automatically dispensing sheets of wrapping material in overlapping relation over the chamber and plant material therein. The system includes apparatus for joining the overlapping sheets together. The system is automatically operable to dispense sheets of the material in overlapping relation over the chamber and join them for receiving a flow of the plant material thereon. Before or while the plant material is received, the sheets are further dispensed to move downwardly in the chamber to receive and wrap about the plant material. The system then dispenses opposite ends of the sheets in overlapping relation over the material and joins the ends to complete the wrapper.

12 Claims, 14 Drawing Sheets

(56) References Cited

U.S. PATENT DOCUMENTS

| | | | |
|---|---|---|---|
| 5,704,283 A | 1/1998 | Wiedel | |
| 5,855,107 A | 1/1999 | Haffield | |
| 6,026,957 A | 2/2000 | Bauer et al. | |
| 6,085,487 A | 7/2000 | De Vlaam | |
| 6,481,186 B2 * | 11/2002 | Kokkersvold et al. | 53/447 |
| 6,658,819 B2 | 12/2003 | Gamberini | |
| 6,941,740 B2 | 9/2005 | Fox et al. | |
| 7,007,596 B2 | 3/2006 | Telscher | |
| 2006/0000193 A1 | 1/2006 | Naeyaert et al. | |
| 2006/0059863 A1 * | 3/2006 | Michler et al. | 53/399 |

FOREIGN PATENT DOCUMENTS

| | | |
|---|---|---|
| EP | 1332968 | 11/2005 |
| FR | 2735947 | 6/1995 |
| WO | 2010034116 | 4/2010 |

* cited by examiner

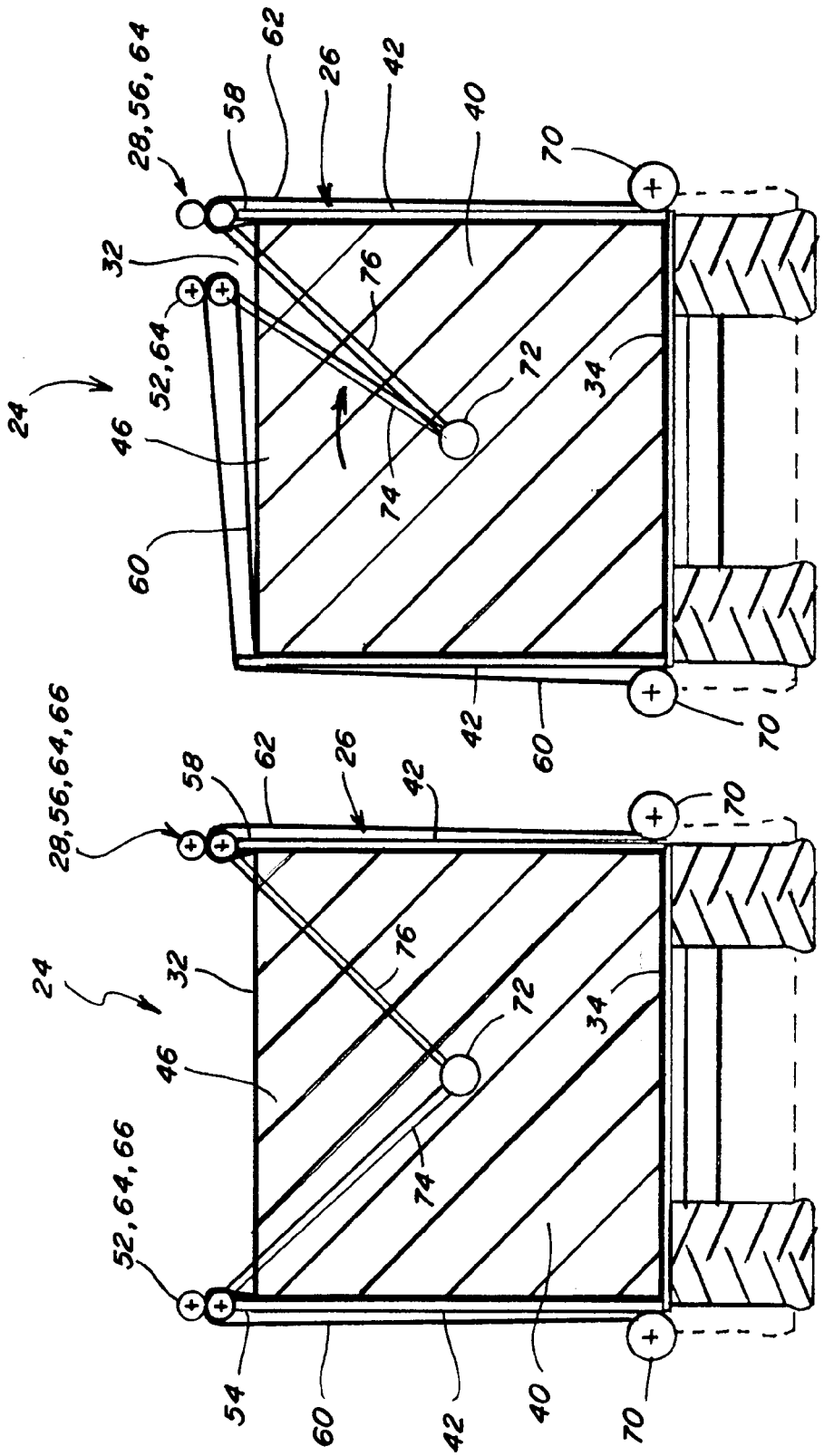

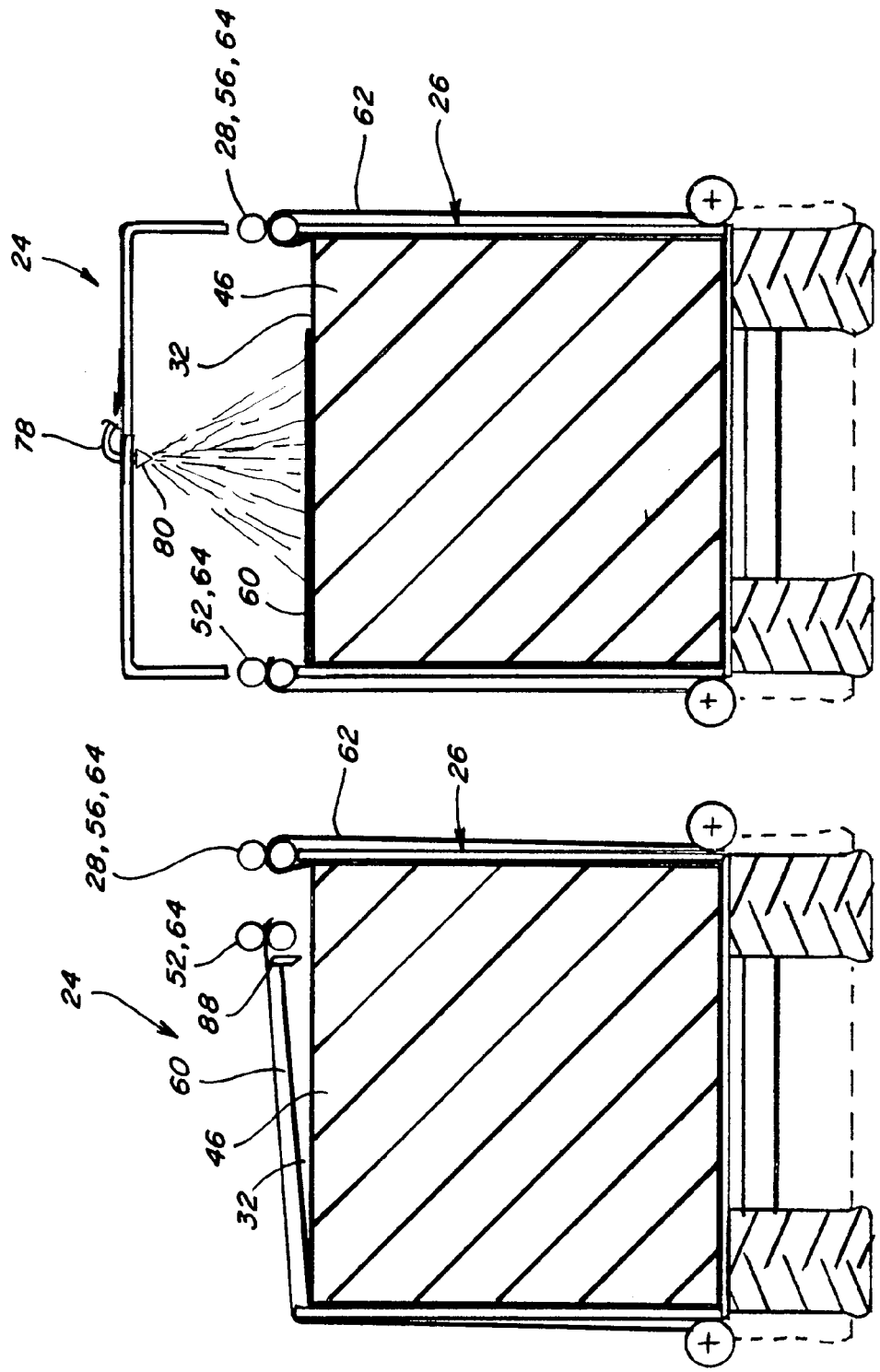

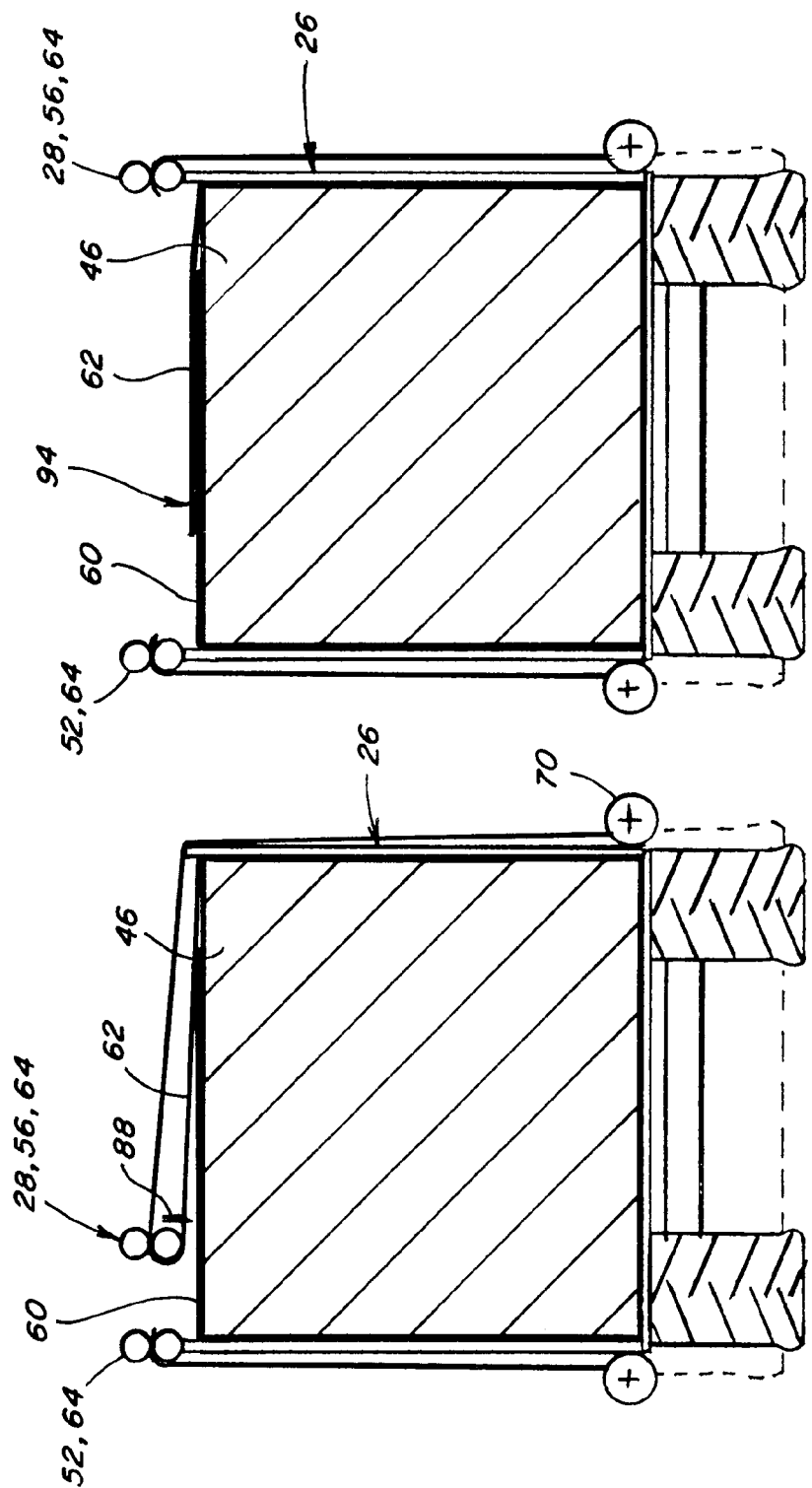

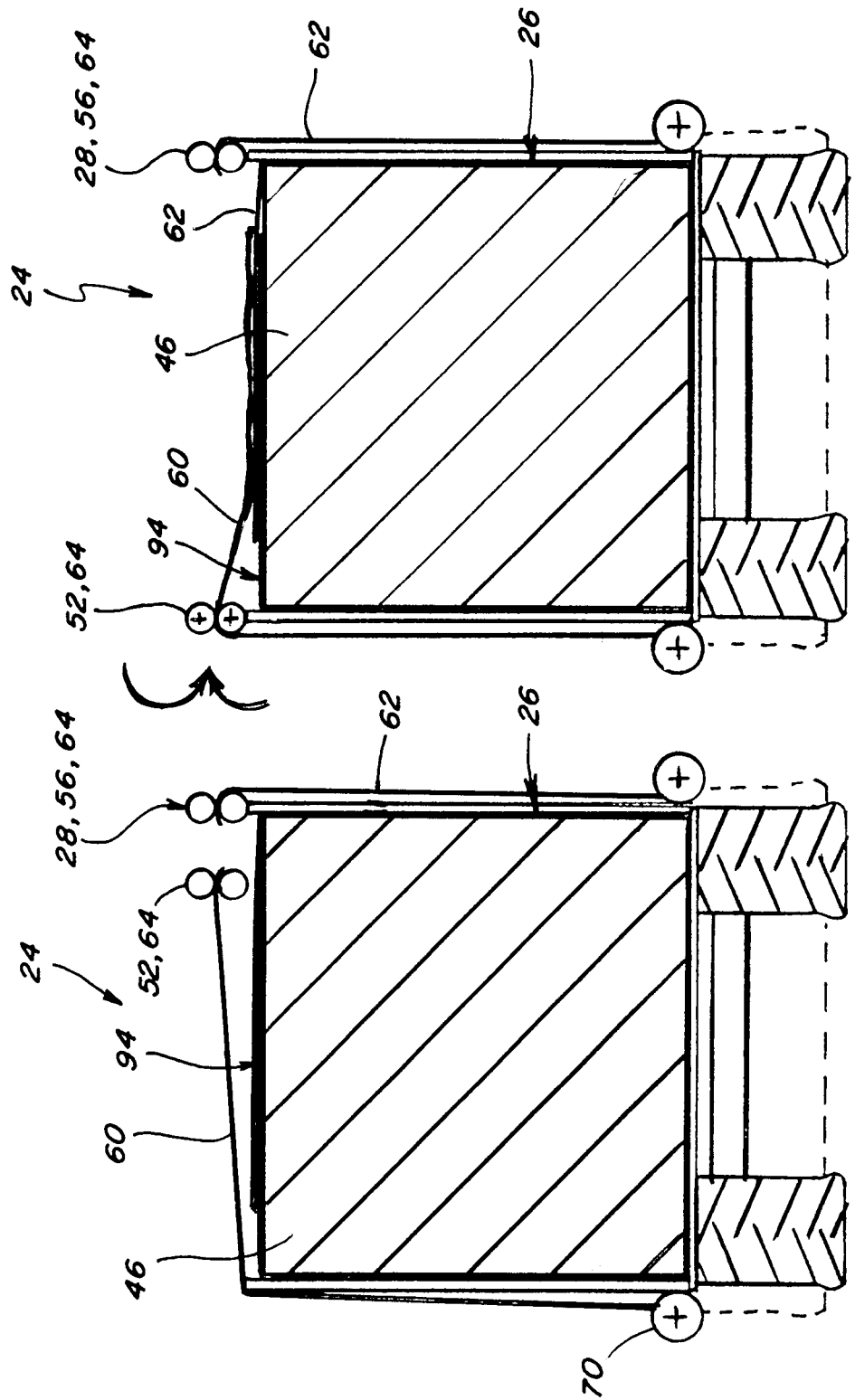

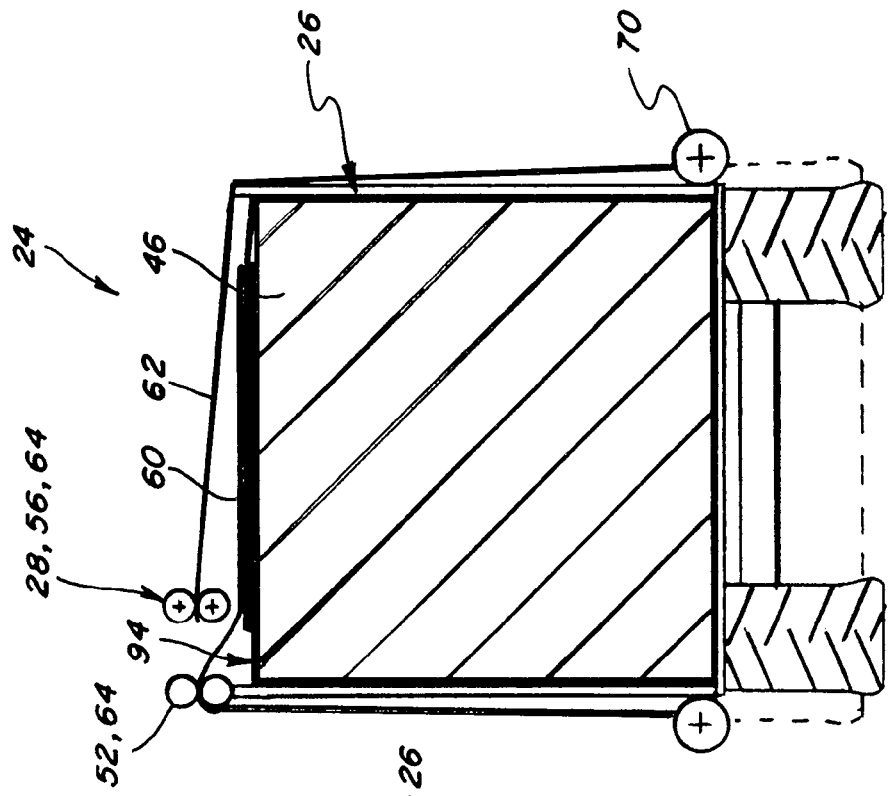
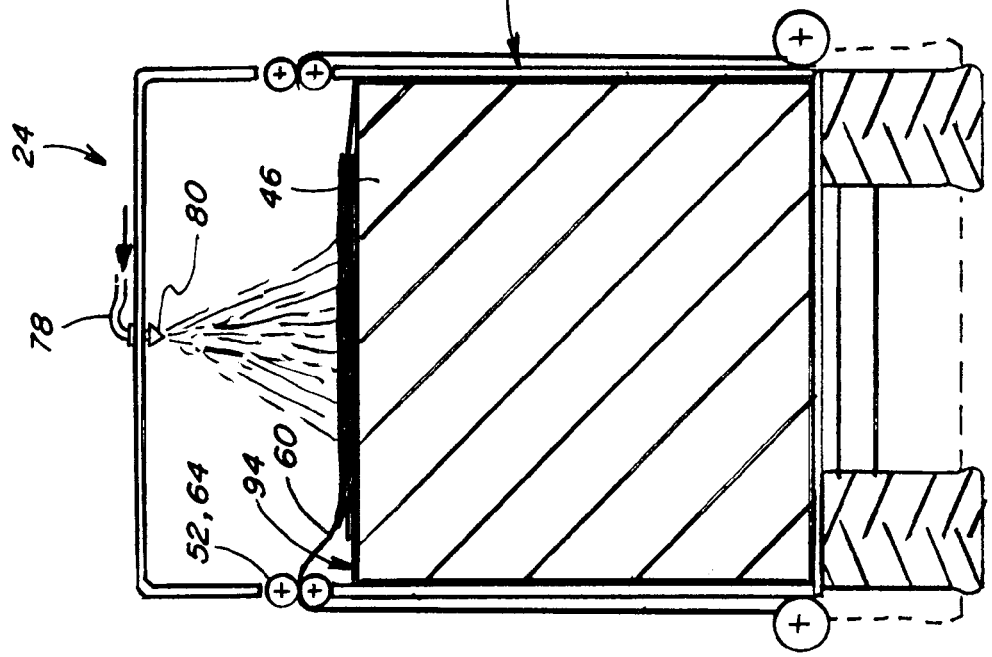
Fig. 11
Fig. 10

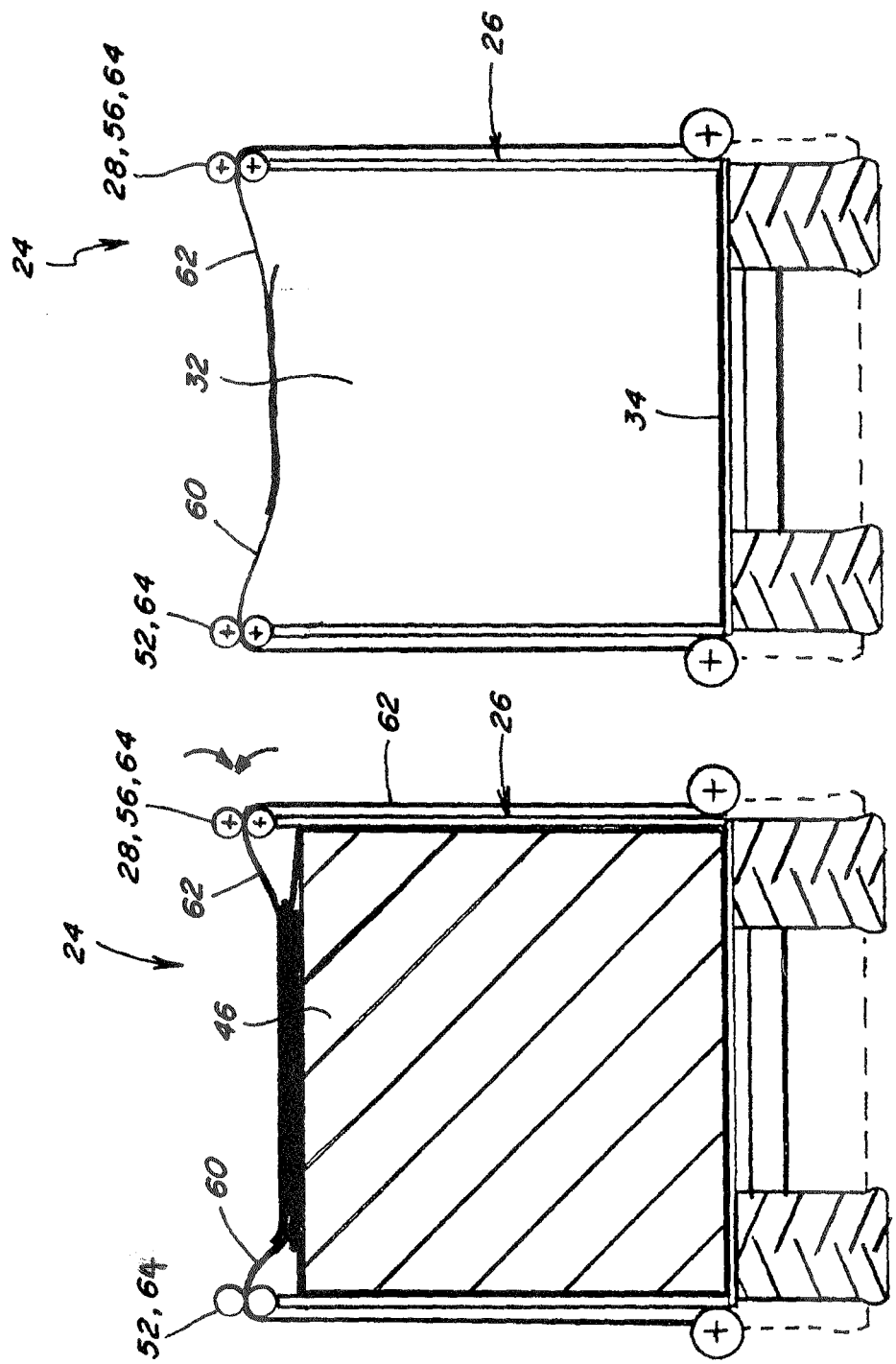

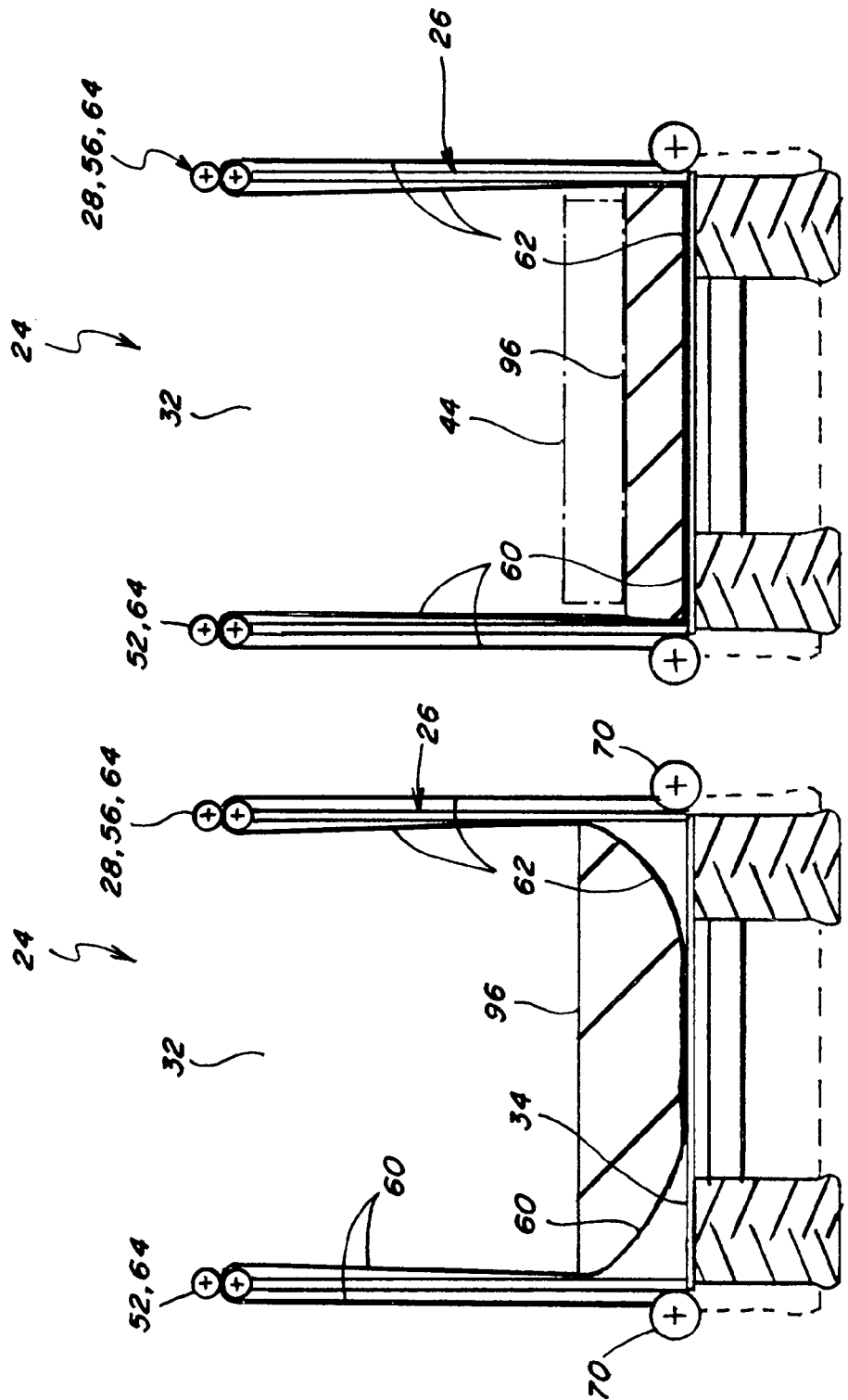

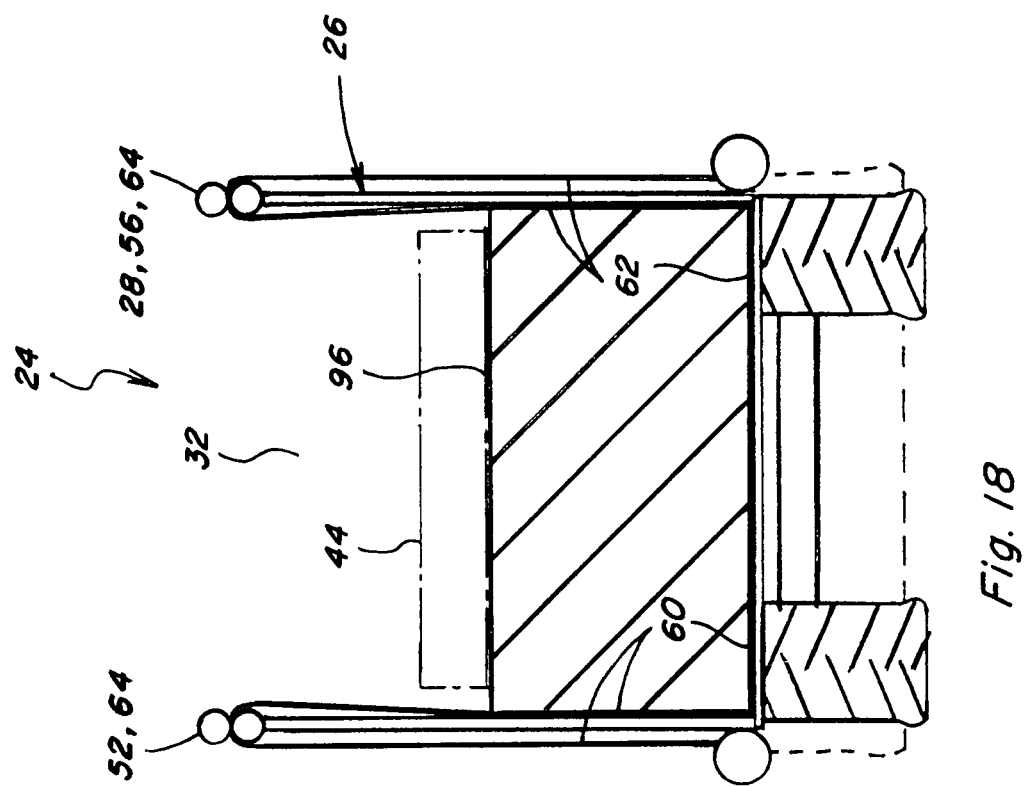

BALE WRAPPING SYSTEM AND METHOD FOR A PLANT MATERIAL COMPACTOR

This application claims the benefit of U.S. Provisional Application No. 61/402,124, filed Aug. 24, 2010.

TECHNICAL FIELD

This invention relates generally to a system and method for wrapping bales of agricultural plant material including, but not limited to, cotton bales, and biomass bales, in a plant material compactor or other bale forming apparatus, and more particularly, which forms a glued together wrapper in the compactor or apparatus, to be filled with the plant material, and then completes the wrapper prior to unloading of the bale.

BACKGROUND ART

The disclosure of U.S. Provisional Application No. 61/402,124, filed Aug. 24, 2010, is hereby incorporated herein in its entirety by reference.

Large unitary bales of agricultural material, e.g., cotton, biomass, hayage, silage, etc., also commonly referred to as modules, are a common manner of packaging for high productivity. Presently, large baling and compacting apparatus carried on or towed by harvesting machines, also referred to as module builders or on-board module builders (OBMB), are capable of forming bales and modules as large as 8 feet by 8 feet by 16 feet (approx. 250 by 250 by 500 cm). These bales and modules are typically unloaded to ground level without covers or other wrapping materials. This unloading can occur in the field, or at the periphery of the field, and the bales or modules are picked up later for processing, use, or storage. Tarps designed to cover the top and partially the sides of the bales or modules are often installed within a few hours after unloading. Such bales or modules would benefit, however, by being wrapped or packaged prior to being unloaded, that is, before the OBMB tilts to unload or otherwise unloads the bale or module onto a field or other location. An advantage would be that the integrity of the bale or module would be improved and ground losses of the agricultural material would be reduced.

Therefore, what is sought is a system and method for wrapping large bales and modules of agricultural material including, but not limited to, cotton bales and biomass bales, before being unloaded onto the ground, so as to improve integrity and reduce ground losses.

SUMMARY OF THE INVENTION

What is disclosed is a system and method for wrapping large bales and modules of agricultural material including, but not limited to, cotton bales and biomass bales, before being unloaded onto the ground, so as to improve integrity and reduce ground losses. The term "biomass" should be interpreted broadly to include that and other balable plant materials.

According to a preferred aspect of the invention, the system and method are utilized on or in association with a mobile compacting apparatus.

According to another preferred aspect of the invention, the system and method utilize a first wrapping material dispenser disposed along a first upper periphery of a compacting chamber, and a second wrapping material dispenser opposite the first dispenser, for automatically dispensing sheets of wrapping material in overlapping relation over the chamber and plant material therein. The system and method also utilize apparatus for joining the overlapping sheets together and for cutting the sheets.

According to another preferred aspect of the invention, the system is automatically operable to dispense sheets of the material in overlapping relation over the chamber and join them for receiving a flow of the plant material thereon. Preferably, this is done with the sheets resting on an already wrapped bale in the chamber. After the existing bale is removed from the chamber, but before or while additional plant material is received, the sheets are further dispensed to allow the joined sheets to fall downwardly into the chamber. The system then dispenses opposite ends of the sheets in overlapping relation over the material and joins the ends to complete the wrapper. The initial steps can then be repeated to start a new wrapper before the wrapped bale is removed.

According to another preferred aspect of the invention, the wrapping material dispensers each including powered pinch rollers supported for movement from the sides of the upstanding structure to a location past a center of an upper region of the chamber, respectively. And, the pinch rollers are controllably operable in a first rotating mode for dispensing the sheets therefrom; in a second rotating mode for moving along the dispensed sheets; and in a non-rotating mode for extending the sheets. As a result, the dispensers are operated in the non-rotating mode to bring the sheets, and the ends of the sheets, into the overlapping relation to the chamber. The dispensers are operated in the first rotating mode to dispense the sheets to extend downwardly into the chamber. And, the dispensers are operated in the second rotating mode after the sheets and the ends of the sheets are extended over the chamber, respectively, but before being joined together, so as to be clear of the joining operation.

According to another preferred aspect of the invention, the wrapping material dispensers are disposed on mechanisms configured and operable for moving the dispensers over the chamber and back to the sides. As non-limiting examples, the mechanisms can include pivoting arms, linear actuators, or the like.

BRIEF DESCRIPTION OF THE DRAWINGS

FIG. 2 is a rear view of the harvester of FIG. 1, showing the wrapping system of the invention configured for performing a step of the method of the invention;

FIG. 3 is another rear view of the harvester of FIG. 1, showing the wrapping system of the invention configured for performing another step of the method of the invention;

FIG. 4 is another rear view of the harvester of FIG. 1, showing the wrapping system of the invention configured for performing another step of the method of the invention;

FIG. 5 is another rear view of the harvester of FIG. 1, showing the wrapping system of the invention configured for performing another step of the method of the invention;

FIG. 6 is another rear view of the harvester of FIG. 1, showing the wrapping system of the invention configured for performing another step of the method of the invention;

FIG. 7 is another rear view of the harvester of FIG. 1, showing the wrapping system of the invention configured for performing another step of the method of the invention;

FIG. 8 is another rear view of the harvester of FIG. 1, showing the wrapping system of the invention configured for performing another step of the method of the invention;

FIG. 9 is another rear view of the harvester of FIG. 1, showing the wrapping system of the invention configured for performing another step of the method of the invention;

FIG. 10 is another rear view of the harvester of FIG. 1, showing the wrapping system of the invention configured for performing another step of the method of the invention;

FIG. 11 is another rear view of the harvester of FIG. 1, showing the wrapping system of the invention configured for performing another step of the method of the invention;

FIG. 12 is another rear view of the harvester of FIG. 1, showing the wrapping system of the invention configured for performing another step of the method of the invention;

FIG. 13 is another rear view of the harvester of FIG. 1, showing the wrapping system of the invention configured for performing another step of the method of the invention;

FIG. 16 is another rear view of the harvester of FIG. 1, showing the wrapping system of the invention configured for performing another step of the method of the invention;

FIG. 17 is still another rear view of the harvester of FIG. 1, showing the wrapping system of the invention configured for performing another step of the method of the invention;

FIG. 18 is another rear view of the harvester of FIG. 1, showing the wrapping system of the invention configured for performing another step of the method of the invention.

DETAILED DESCRIPTION OF THE INVENTION

Figure 1:
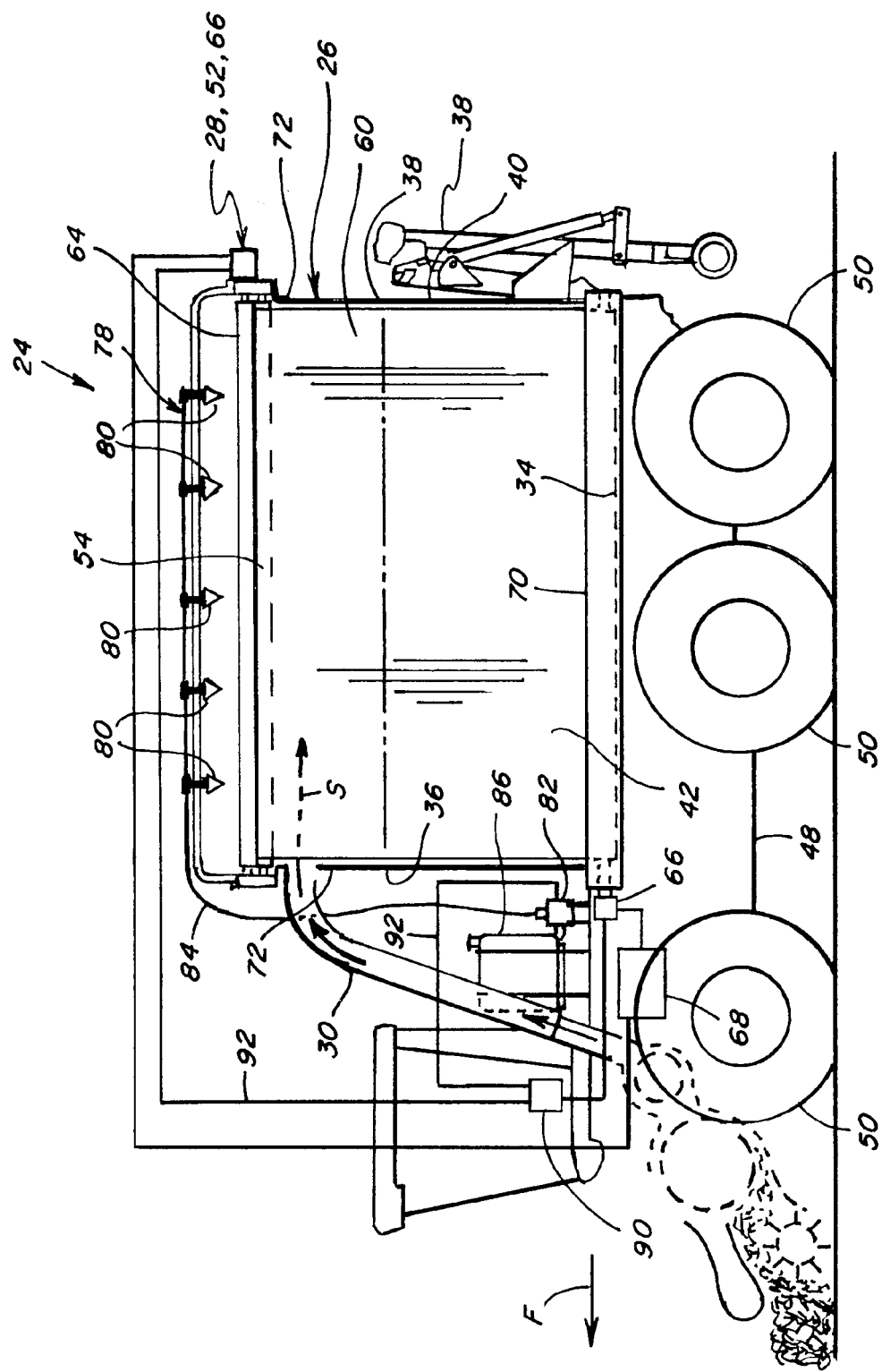
FIG. 1 is a simplified side view of a plant material harvester having a plant material compactor including a wrapping system of the invention operable according to a method of the invention.
Figure 1A:
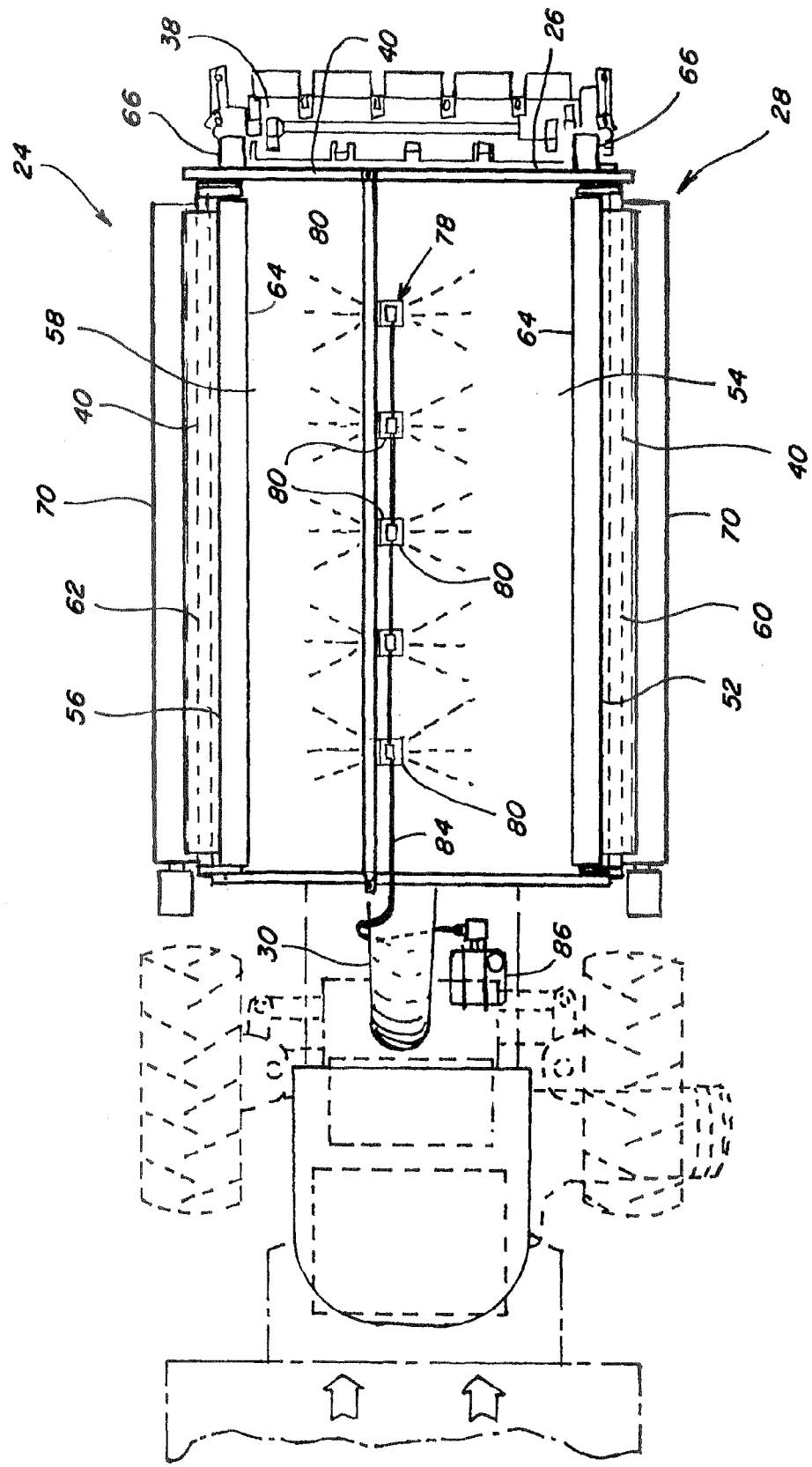
FIG. 1A is a top view of the harvester of FIG. 1, showing the wrapping system of the invention.

Referring now to the drawings, FIGS. 1 and 1A show a self-propelled agricultural plant material harvester 24 including an on-board plant material compactor 26, for collecting and compacting the harvested plant material into compacted unitary bales. Harvester 24 additionally includes a wrapping system 28 constructed and operable according to the invention, for preparing a wrapper for the bales, and wrapping the bales, prior to unloading from compactor 26. Harvester 24 and compactor 26 are configured and operable for unloading bales onto the ground or another surface, or another vehicle such as a self-propelled bale handler, trailer, wagon, truck, or the like, either as harvester 24 is stationary, or moves in a forward direction F over a field, or rearwardly. Harvester 24 here is configured to include apparatus on a forward end thereof, of conventional construction and operation for picking or picking up, and propelling an airborne stream of plant material upwardly and rearwardly through a duct or ducts 30 into a compacting chamber 32 of compactor 26, as denoted by arrow S. Alternatively, or in conjunction with airborne flow, mechanical conveyance can also be used for moving the plant material. As representative examples, the plant material can include cotton, a variety of biomass products, such as typically used for silage and the like, hayage, sugar cane residue, and the like. It should also be noted that the invention can be used with a pull type harvester.

Referring also to FIGS. 2 and 3, compacting chamber 32 is defined on the bottom by a floor 34; at the forward end by an upstanding forward wall 36; at the rear end by an upstanding unloading door 38 enclosing an unloading opening 40; and on the opposite sides by upstanding side walls 42. Compactor 26 can include compacting apparatus 44 (illustrated schematically in FIGS. 15, 16 and 17) of well-known construction, in an upper region of chamber 32, operable to forcibly move downwardly therein for compacting the plant material against floor 34 for forming a unitary compacted module or bale 46 in chamber 32, which will be unloaded through opening 40, all in the well-known manner. Compactor 26 is supported on a frame 48 of harvester 24, which also carries an operator cabin, an engine a drivetrain (not shown) connected in driving relation to wheels 50 that support harvester 24 for movement over the ground and other surfaces, also a in the well-known manner.

As representative, but non-limiting values, a bale 46 produced by compactor 26 will have a length of about 16 feet, a width of about 8 feet and a height of up to about 8 feet or 500×250×250 cm.

Wrapping system 28 of the invention includes a first wrapping material dispenser 52 disposed when in a standby position, along a first upper periphery 54 of compacting chamber 32, which here is defined by an upper region of one of the side walls 42. System 28 includes a second wrapping material dispenser 56 disposed when in its standby position, along a second upper periphery 58 of chamber 32, which here is defined by an upper region of a second of side walls 42, opposite first dispenser 52. Dispensers 52 and 56 each extends substantially the front to rear length of chamber 32, and each is configured for automatically dispensing a first sheet 60 and a second sheet 62, respectively, of wrapping material over chamber 32 and the plant material therein, here, shown already compacted into a bale 46. For this purpose, sheets 60 and 62 are of sufficient width (front to rear) for substantially covering chamber 32 from front to rear. Each dispenser 52 and 56 is controllably driven by a drive 66 (FIG. 1) which can be electrical or fluid driven, e.g., including a fluid motor supplied by a pressurized fluid system 68 of harvester 24, and a gear set, connected in driving relation with the rollers of pinch roll set 64 for counter-rotating the rollers in a commanded direction. Each dispenser 52 and 56 additionally includes a supply roll 70 of the sheet material, at a suitable location, such as along the respective bottom of side wall 42 of compactor 26, such that sheets 60 and 62 extend generally vertically outwardly of side walls 42, between supply roll 70 and pinch roll set 64 of the respective dispenser. Supply roll 70 of each dispenser 52 and 56 is also preferably driven by a drive 66, which can again comprise, but is not limited to, a fluid or electric motor powered by a fluid system of harvester 24.

Pinch roller sets 64 of dispensers 52 and 56 of wrapping system 28 are preferably carried on powered drive mechanisms 72 controllably operable for moving the roller sets sidewardly over the upper end of compacting chamber 32. Here, drive mechanisms 72 are located at the front and rear ends of chamber 32 and include a suitable driver, such as, but not limited to, a linear or rotary actuator, controllable for pivoting support arms 74 and 76 carrying the respective pinch roller sets 64 between its standby position (FIG. 2) adjacent the respective side wall 42, and a range of operative positions over chamber 32 (illustrated by the position of support arm 74 in FIG. 3), e.g., for pulling or extending the respective sheet 60 or 62 a desired extent over the chamber (illustrated in FIG. 3 by the position of sheet 60), as will be explained. Further in this regard, rear drive mechanisms 72 is illustrated in unloading opening 40, and will necessarily be configured so as to move out of the way of bales being unloaded, utilizing suitable additional support structure for that purpose, e.g., a folding arm, scissors mechanism, or the like (not shown). As a non-limiting alternative, mechanisms 72 can include linear drives such as screw drives, located over forward wall 36 and unloading opening 40 so as not to require movement out of opening 40. Hereafter, in the subsequent illustrations, mechanisms 72 are deleted for simplicity.

System 28 includes apparatus for joining sheets 60 and 62 together when overlapped, as will be explained, which here includes an adhesive spray apparatus 78. Apparatus 78 extends forward and rearwardly above chamber 32. Spray system 78 includes a linear array of spray nozzles 80 disposed for directing adhesive downwardly. Nozzles 80 are connected to a supply pump 82 via a supply line 84 for receiving adhesive from a reservoir 86 on harvester 24. Nozzles 80 are contemplated to be positioned above compacting apparatus 44 and will necessarily be positioned so as to spray through suitable apertures or spaces therethrough. The adhesive dispensed by system 78 should be selected as a contact type adhesive which will become tacky immediately, so as to be sufficient for virtually immediately joining together and permanently bonding sheets of the wrapping material, e.g., sheets 60 and 62, when brought together without substantial pressure exerted to press the sheets together. It is also desired that the adhesive be organic. It is contemplated that sheets 60 and 62 will comprise a suitable plastics material, such as, but not limited to, a commercially available polyethylene film, and the adhesive should be selected says to be compatible with the sheeting material used.

Each of dispensers 52 and 56 includes cutting apparatus 88 operable along the length thereof (FIGS. 4 and 6) for cutting sheets 60 and 62, respectively. For example, apparatus 88 can include a traveling knife movable by a linear actuator, or a hot wire, that can be actuated at the proper time for cutting the sheet.

Wrapping system 28 additionally includes a processor based controller 90 (FIG. 1) connected in operative control of the various components of system 28, including, but not limited to, drives 66 of dispensers 52 and 56, drive mechanisms 72, pump 82, and cutting apparatus 88, via suitable communication paths 90, such as, but not limited to, wires of a wiring harness, or a wired or wireless controller network.

Referring now to FIGS. 2 through 18, operation of wrapping system 28 for preparing a wrapper 94 for wrapping a bale 46 in compacting chamber 32 of compactor 26 on harvester 24, according to a preferred method of the invention, will be explained.

In FIG. 2, as noted above, wrapping system 28 is at rest, with dispensers 52 and 56 in their standby positions above side walls 42. A completed bale 46 resides in compacting chamber 32. It can be observed and appreciated that sheet 60 extends upwardly from supply roll 70 along the outside of the adjacent side wall 42, about the lower roller of pinch roller set 64 of dispenser 52, and downwardly along the inside surface of side wall 42 and over midway across floor 34. Similarly, sheet 62 extends upwardly from its supply roll 70 along the outside of the adjacent side wall 42, about the lower roller of pinch roller set 64 of dispenser 56, and downwardly along the inside of adjacent side wall 42, and partially across floor 34, and is permanently joined together with sheet 60 by the adhesive, forming the sides and bottom of a wrapper for bale 46.

In FIG. 3, drive mechanism 72 has been activated to pivot support arms 74 toward support arms 76 (front and rear), so as to move first wrapping material dispenser 52 over the upper region of chamber 32. As this occurs, pinch roller set 64 is operated to counter-rotate and supply roll 70 is rotated, to extend first sheet 60 for covering a substantial portion of bale 46. Here, it should be observed that two layers of sheet 60 extend over bale 46 as a result of the looping of sheet 60 over the lower roller of the pinch roller set 64. Now, in FIG. 4, cutting apparatus 88 of dispenser 52 is operated to cut the lower layer of sheet 60, so as to fall onto the top surface of bale 46.

Referring to FIGS. 5 and 6, drive mechanisms 72 is now operated to move support arm 74 to return dispenser 52 to its standby position. At the same time, the associated supply roll 70 will be operated to retract sheets 60 to maintain some amount of tension therein. Next, adhesive spray apparatus 78 is operated to discharge adhesive from nozzles 80, along the forward to rearward length of sheet 60, as illustrated in FIG. 5. Now drive mechanisms 72 will be operated to pivot support arm 76 to move second wrapping material dispenser 56 toward dispenser 52, while pinch roller set 64 of dispenser 56 is operated to counter-rotate the rollers thereof, and the associated supply roll 70 is rotated, to extend sheet 62 over sheet 60 on top of bale 46, as illustrated in FIG. 6. As with sheet 60, sheet 62 loops about the lower roller of pinch roller set 64, such that two layers of that sheet are present over the bale. Cutting apparatus 88 of dispenser 56 is now operated to cut sheet 62, such that the lower layer will fall onto sheet 60 on top of the bale. Because the adhesive has been applied to the upper surface of sheet 60 and is immediately tacky, sheet 62 will be immediately adhered and permanently joined to sheet 60, thereby completing a wrapper 94 about bale 46.

Before unloading the now wrapped bale 46, the bottom of a second wrapper will be prepared on top of the wrapped bale. Referring to FIGS. 8 and 9, dispenser 52 will be operated to extend sheet 60 over bale 46 as shown. Here, it should be noted that because sheet 60 was previously cut, only one layer will be present. Thus, to perform this operation, pinch roller set 64 of dispenser 52 will not operate, but roller 70 will be operated to extend the sheet. As illustrated in FIG. 9, pinch roller set 64 of dispenser 52 will be counter rotated as indicated by the arrows, and the drive mechanism 72 operated to return dispenser 52 to its standby position, so as to leave a portion sheet 60 over bale 46.

In FIG. 10, spray apparatus 78 is operated to dispense adhesive from nozzles 80 onto sheet 60 atop bale 46. In FIG. 11, second wrapping material dispenser 56 is now moved to extend sheet 62 over bale 46, and sheet 60 thereon. Similarly to sheet 60, only one layer of sheet 62 extends over the bale. As a result, during this operation, the pinch roller set of dispenser 56 is not operated, but supply roll 70 is rotated to feed more material. Here, because of the presence of the adhesive on sheet 60, it is important to maintain tension on sheet 62, so as not to come into contact with sheet 60. Now the pinch roller set of dispenser 56 will be operated to counter-rotate the rollers thereof, while dispenser 56 is moved back to its standby position, such that the free end of sheet 62 will fall onto and be adhesively joined to, sheet 60, as illustrated in FIG. 12.

Figure 14:
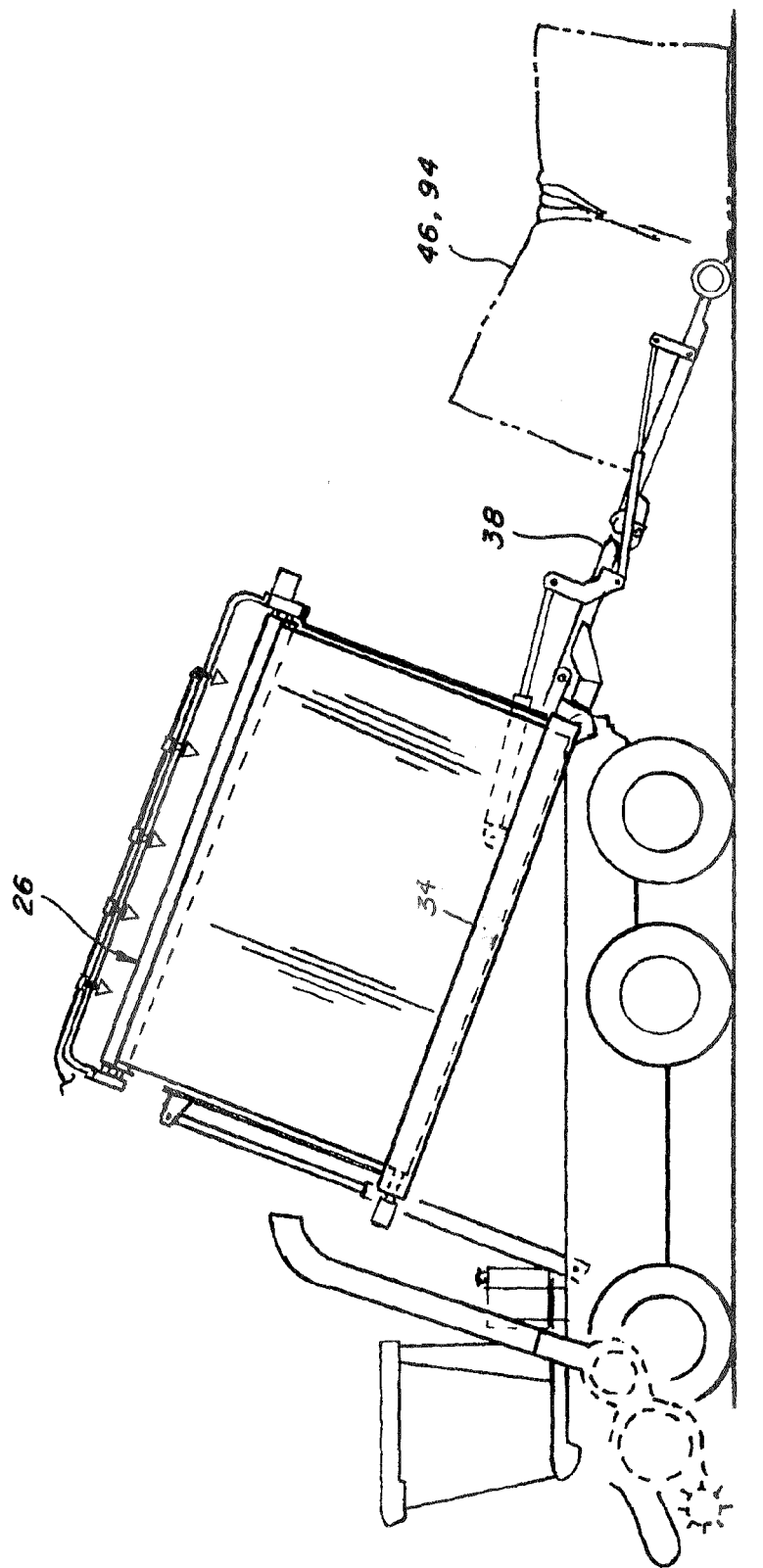
FIG. 14 is a side view of the harvester of FIG. 1, showing the compacting structure tilted for unloading a bale wrapped using the wrapping system of the invention.
Figure 15:
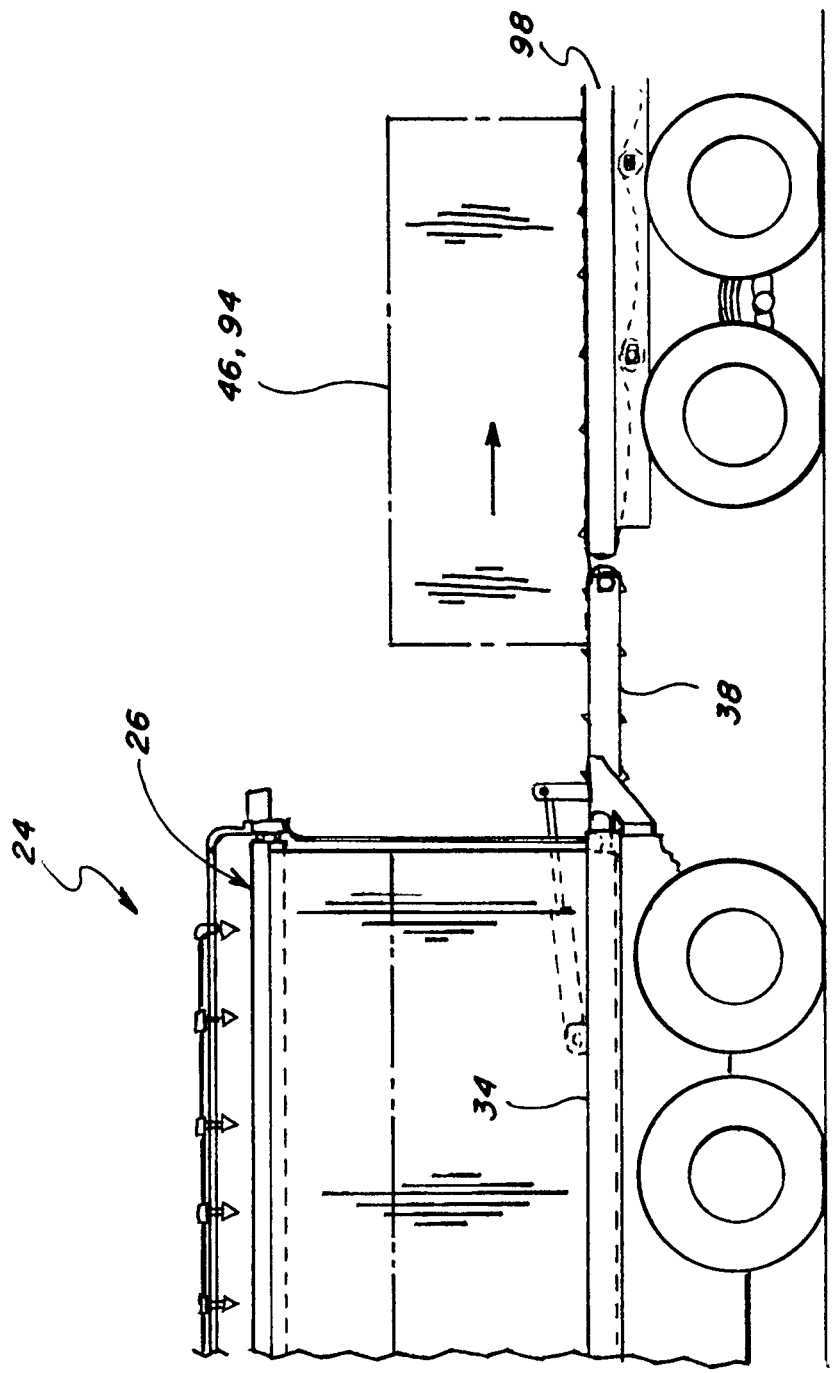
FIG. 15 is another side view of the harvester of FIG. 1, shown towing an optional bale caddy carrying a bale wrapped by the wrapping system of the invention.

Referring now jointly to FIGS. 13, 14 and 15, wrapped bale 46 can be unloaded from chamber 32 of compactor 26 in a desired manner. FIG. 14 illustrates one manner of unloading, wherein compactor 26 is tilted and unloading door 38 unfolded, such that the wrapped bale can be conveyed over floor 34 and door 38 onto the ground or another surface. FIG. 15 illustrates another manner of unloading, wherein compactor 26 is not tipped, but unloading door 38 is configured as a conveyor lowerable in parallel relation to floor 34, for unloading onto a bed of a truck 98, a trailer, or a caddy. In FIG. 13, it can be observed that after unloading, joined together sheets 60 and 62 will be suspended from dispensers 52 and 56 above or in an upper region of, chamber 32. At this time, pinch roller sets 64 and supply rolls 70 of dispensers 52 and 56 will be operated to extend sheets 60 and 62 such that the joined together ends thereof will be lowered within chamber 32 to form the bottom of a new wrapper against floor 34. At this time also, the unloading door can be closed, and operation of harvester 24 resumed to direct the flow of plant material into chamber 32 for forming another bale.

As can be seen in FIG. 16, plant material 96 entering chamber 32 above joined together sheets 60 and 62 will land on those sheets so as to exert weight thereagainst. Referring also to FIGS. 17 and 18, periodically during the forming of a bale, compacting apparatus 44 of compactor 26 will be lowered into chamber 34 against the material 96 to compact it against floor 34. This and the weight of the material will serve to conform joined together sheets 60 and 62 to floor 34 and also the side walls and ends of chamber 32, to impart a rectangular shape to the material and sheets. At this time, it can be observed that sheets 60 and 62 again loop about the bottom rollers of the respective pinch roller sets to 64. Now, when the material 96 is compacted to the desired extent, e.g., forms a bale as described above, the wrapper can be completed in the above described manner, and the bale unloaded.

Figure 19:
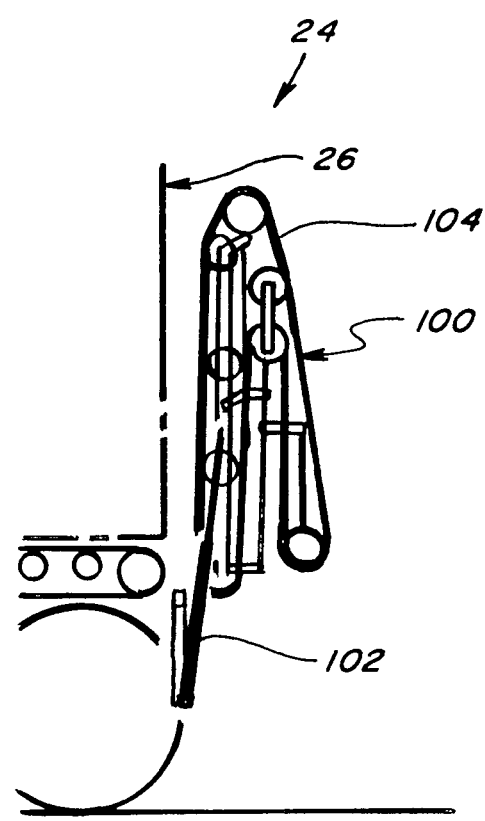
FIG. 19 is a simplified fragmentary side view of the harvester, showing an embodiment of an unloading door for use therewith, in a folded closed configuration.
Figure 20:
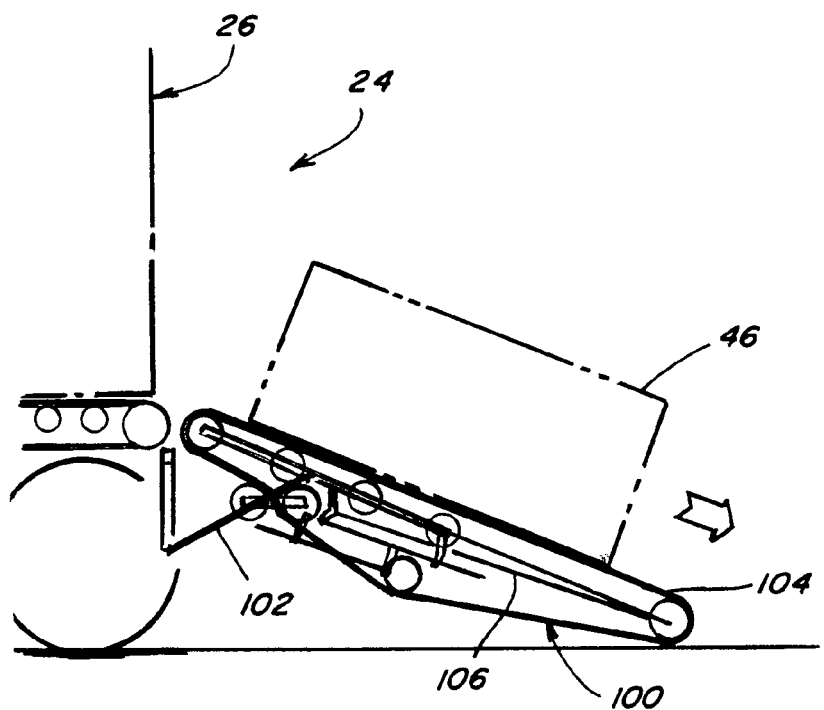
FIG. 20 is another simplified fragmentary side view of the harvester, showing the door of FIG. 19 unfolded in a configuration for unloading onto the ground or another surface below the harvester.
Figure 21:
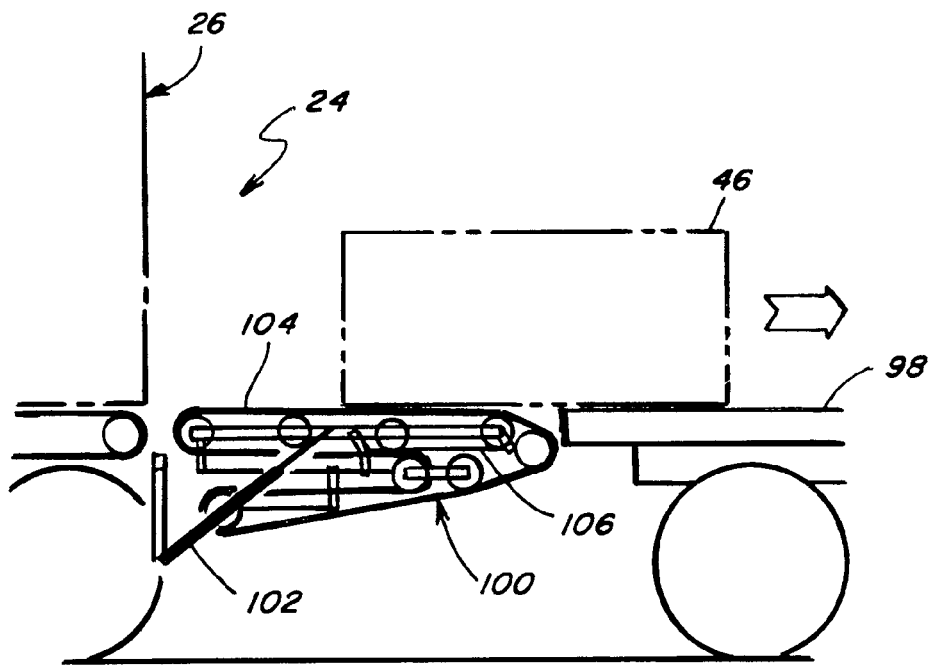
FIG. 21 is another simplified fragmentary side view of the harvester, with the door of FIG. 19 in rearward level orientation, for unloading onto the bed of a truck, a trailer, or other surface.

Referring also to FIGS. 19, 20 and 21, harvester 24 is shown including an unloading door 100 configurable in a folded manner next to the rear of compactor 26 (FIG. 19); extended downwardly to the ground to for unloading a bale 46 thereon (FIG. 20); and in a rearwardly extending orientation (FIG. 21) for unloading to a truck 98 trailer, caddy, or the like. The door 100 can also be used in the configuration of FIG. 21 for receiving a bale 46, and then tilted as shown in FIG. 20, for unloading the bale onto the ground or other surface therebelow. In this regard, drivers 102 such as fluid cylinders or the like, can be used for manipulating door 100 between the positions shown, and door 100 can include drivers 106 for extending a moving belt 104 thereof for reaching the ground or other surface onto which the bale is to be unloaded. Other door configurations can also be used, as desired or required for a particular application.

It can be observed that wrapper 94 will provide greater adhesion and integrity to a bale 46, and will reduce ground losses of the plant material.

In light of all the foregoing, it should thus be apparent to those skilled in the art that there has been shown and described a novel bale wrapping system and method. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. On a plant material compacting apparatus having a floor and upstanding structure extending thereabout defining a compacting chamber for receiving a flow of plant material from above,
   an improvement comprising a system for wrapping a bale of the plant material formed in the compacting chamber, including a first wrapping material dispenser disposed along a first upper periphery of the structure bounding a first side of the compacting chamber, and a second wrapping material dispenser disposed along a second upper periphery of the structure bounding a second side of the chamber opposite the first side, the dispensers being configured for automatically operating to dispense sheets of wrapping material, respectively, in overlapping relation over the chamber, and apparatus configured and operable for joining the overlapping sheets together;
   the system being configured for automatically operating to dispense sheets of the wrapping material in overlapping relation over the chamber, and to join the overlapping sheets together so as to be positioned for receiving the flow of the plant material thereon, and before or while the plant material is received thereon to further dispense the sheets to allow the joined sheets to move downwardly into the chamber and against the floor so as to receive and wrap about the plant material, and then to dispense opposite ends of the sheets in overlapping relation over the received plant material and to loin the overlapping ends together such that the sheets form a wrapper extending completely about the received plant material.

2. On the plant material compacting apparatus of claim 1, the improvement further comprising the wrapping material dispensers each including apparatus configured and operable for cutting the sheets dispensed thereby, respectively.

3. On the plant material compacting apparatus of claim 1, the improvement further comprising the wrapping material dispensers including supply rolls of the sheets external to the upstanding structure.

4. On the plant material compacting apparatus of claim 1, the improvement further comprising the wrapping material dispensers each including powered pinch rollers supported for movement from the sides of the upstanding structure to a location past a center of an upper region of the chamber, respectively, the pinch rollers being controllably operable in a first rotating mode for dispensing the sheets therefrom; in a second rotating mode for moving along the dispensed sheets; and in a non-rotating mode for extending the sheets.

5. On the plant material compacting apparatus of claim 4, the improvement further comprising the wrapping material dispensers being disposed on mechanisms configured and operable for moving the dispensers over the chamber.

6. On the plant material compacting apparatus of claim 1, the improvement further comprising the apparatus configured and operable for joining the overlapping sheets together comprising at least one nozzle disposed above the chamber operable for dispensing an adhesive onto one of the sheets for joining the sheets together.

7. On the plant material compacting apparatus of claim 1, the improvement further comprising the sheets comprising a plastics material.

8. On a plant material compacting apparatus having a floor and upstanding structure extending thereabout defining a compacting chamber for receiving a flow of plant material from above, an improvement comprising a method for wrapping a bale of the plant material formed in the compacting chamber, including steps of providing a first wrapping material dispenser disposed along a first upper periphery of the structure bounding a first side of the compacting chamber, and a second wrapping material dispenser disposed along a second upper periphery of the structure bounding a second side of the chamber opposite the first side;

automatically operating the dispensers to dispense sheets of wrapping material, respectively, in overlapping relation over the chamber;

providing apparatus configured and operable for joining the overlapping sheets together;

automatically operating the system to dispense sheets of the wrapping material in overlapping relation over the chamber, and to join the overlapping sheets together so as to be positioned for receiving the flow of the plant material thereon;

before or while the plant material is received thereon, further automatically dispensing the sheets such that the joined sheets will move downwardly into the chamber and against the floor for receiving and wrapping about the plant material; and then automatically dispensing opposite ends of the sheets in overlapping relation over the received plant material and joining the overlapping ends together such that the sheets form a wrapper extending completely about the received plant material.

9. On the plant material compacting apparatus of claim 8, the improvement further comprising additional steps of:
providing apparatus configured and operable for cutting the sheets dispensed by the dispensers; and
after the sheets are dispensed, respectively, but before the sheets are joined, cutting the sheets.

10. On the plant material compacting apparatus of claim 8, the improvement further comprising the wrapping material dispensers each including powered pinch rollers supported for movement from the sides of the upstanding structure to a location past a center of an upper region of the chamber, respectively, the pinch rollers being controllably operable in a first rotating mode for dispensing the sheets therefrom; in a second rotating mode for moving along the dispensed sheets; and in a non-rotating mode for extending the sheets.

11. On the plant material compacting apparatus of claim 10, the improvement further comprising the wrapping material dispensers being disposed on mechanisms configured and operable for moving the dispensers over the chamber.

12. On the plant material compacting apparatus of claim 8, the improvement further comprising the apparatus configured and operable for joining the overlapping sheets together comprising at least one nozzle disposed above the chamber operable for dispensing an adhesive onto one of the sheets for joining the sheets together, and the steps of joining the overlapping sheets, and of joining the overlapping ends, comprising dispensing the adhesive onto one of the sheets and the ends before being joined to the ether of the sheets or the ends.

\* \* \* \* \*